US009185546B2

(12) United States Patent
Tanaka et al.

(10) Patent No.: US 9,185,546 B2
(45) Date of Patent: Nov. 10, 2015

(54) MOBILE COMMUNICATION METHOD, SWITCH, AND SUBSCRIBER INFORMATION SERVER

(75) Inventors: Itsuma Tanaka, Tokyo (JP); Keisuke Suzuki, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 108 days.

(21) Appl. No.: 13/577,130

(22) PCT Filed: Feb. 4, 2011

(86) PCT No.: PCT/JP2011/052380
§ 371 (c)(1),
(2), (4) Date: Sep. 13, 2012

(87) PCT Pub. No.: WO2011/096516
PCT Pub. Date: Aug. 11, 2011

(65) Prior Publication Data
US 2013/0010689 A1    Jan. 10, 2013

(30) Foreign Application Priority Data

Feb. 5, 2010    (JP) ................................ P2010-024863

(51) Int. Cl.
*H04W 40/00*    (2009.01)
*H04W 8/04*    (2009.01)
(Continued)

(52) U.S. Cl.
CPC ................ *H04W 8/12* (2013.01); *H04W 48/14* (2013.01); *H04W 48/18* (2013.01); *H04W 76/02* (2013.01)

(58) Field of Classification Search
USPC .......................................... 455/422; 370/228
See application file for complete search history.

(56) References Cited

U.S. PATENT DOCUMENTS 8,335,187 B2    12/2012    Wilhoite et al.
2011/0090848 A1*    4/2011    Kim et al. ..................... 370/328
(Continued)

FOREIGN PATENT DOCUMENTS

EP    0541026 A2    5/1993
EP    2271162 A1    1/2011
(Continued)

OTHER PUBLICATIONS

3GPP TSG-SA WG2 Meeting #77 S2-100669, "Support for IMS Voice Over PS Indicator for T-ADS," Shenzhen, China, Jan. 18-22, 2010 (2 pages).
(Continued)

*Primary Examiner* — Kevin C Harper
*Assistant Examiner* — Derrick V Rose
(74) *Attorney, Agent, or Firm* — Osha Liang LLP (57) ABSTRACT

A mobile communication method according to the present invention includes a step A in which, in location registration processing of a mobile station, an switch of a first communication scheme and an switch of a second communication scheme send a subscriber information server first information used to determine whether or not all coverage areas have a same capability of providing a telephony service by packet switching; and a step B in which, when a status inquiry request made upon receipt of a terminating-call signal destined for the mobile station is received from an application server, the subscriber information server determines based on the first information whether or not to make an inquiry at the switch of the first communication scheme or the switch of the second communication scheme about whether or not provision of the telephony service by packet switching is possible in an area where the mobile station is located.

4 Claims, 10 Drawing Sheets

(51) Int. Cl.
*H04W 8/12* (2009.01)
*H04W 48/14* (2009.01)
*H04W 48/18* (2009.01)
*H04W 76/02* (2009.01)

(56) References Cited

U.S. PATENT DOCUMENTS

2012/0083277 A1* 4/2012 Ishii et al. ............... 455/437
2012/0106324 A1* 5/2012 Keller et al. ............. 370/225
2012/0258704 A1* 10/2012 Kim et al. ............. 455/422.1

FOREIGN PATENT DOCUMENTS

WO 99/56476 A1 11/1999
WO 2009/031659 A1 3/2009

OTHER PUBLICATIONS

3GPP TSG-SA WG2 Meeting #77 S2-100670, "Support for IMS Voice Over PS Indicator for T-ADS," Shenzhen, China, Jan. 18-22, 2010 (4 pages).
3GPP TS 23.221 V11.0.0, "3rd Generation Partnership Project; Technical Specification Group Services and System Aspects; Architectural Requirements (Release 11)," Valbonne, France, Nov. 2012 (52 pages).
3GPP TS 23.292 V11.3.0, "3rd Generation Partnership Project; Technical Specification Group Services and System Aspects; IP Multimedia Subsystem (IMS) Centralized Services; Stage 2 (Release 11)," Valbonne, France, Jun. 2012 (117 pages).
3GPP TSG-SA WG2 Meeting #77 S2-100667, "Support for IMS Voice Over PS Indicator for T-ADS in SCC AS," Shenzhen, China, Jan. 18-22, 2010 (3 pages).
3GPP TSG-SA WG2 Meeting #77 S2-100668, "Support for IMS Voice Over PS Indicator for T-ADS," Shenzhen, China, Jan. 18-22, 2010 (2 pages).
3GPP TS 23.401 V11.2.0, "3rd Generation Partnership Project; Technical Specification Group Services and System Aspects; General Packet Radio Service (GPRS) Enhancements for Evolved Universal Terrestrial Radio Access Network (E-UTRAN) Access (Release 11)," Valbonne, France, Jun. 2012 (285 pages).
3GPP TS 23.060 V11.2.0, "3rd Generation Partnership Project; Technical Specification Group Services and System Aspects; General Packet Radio Service (GPRS); Service Description; Stage 2 (Release 11)," Valbonne, France, Jun. 2012 (335 pages).
Office Action for Japanese Application No. 2010-024863 mailed on Mar. 8, 2011, with English translation thereof (6 pages).
International Search Report issued for International Application No. PCT/JP2011/052380 mailed Mar. 8, 2011, with English translation thereof (4 pages).
Official Action in counterpart Egyptian Patent Application No. PCT/NA2012/001361 issued May 6, 2014 (3 pages).
Official Action in counterpart Chinese Patent Application No. 201180009222.4 issued on Jun. 4, 2014 (12 pages).
Extended European Search Report for 11739864.4 dated Feb. 19, 2014 (7 pages).
3GPP TS 23.401 V9.3.0 Release 9, LTE; General Packet Radio Service (GPRS) enhancements for Evolved Universal Terrestrial Radio Access Network (E-UTRAN) access (35 pages).
NTT DOCOMO, "HSS Optimization for T-ADS", 3GPP TSG SA WG2 Meeting #78; TD S2-101429; San Francisco, USA, Feb. 22-26, 2010 (4 pages).
NTT DOCOMO, "HSS Optimisation for T-ADS", 3GPP TSG-SA WG2 Meeting #78; S2-1001431; San Francisco, USA, Feb. 22-26, 2010 (49 pages).

* cited by examiner

MOBILE COMMUNICATION METHOD, SWITCH, AND SUBSCRIBER INFORMATION SERVER

TECHNICAL FIELD

The present invention relates to a mobile communication method, a switch, and a subscriber information server.

BACKGROUND ART

Figure 8:
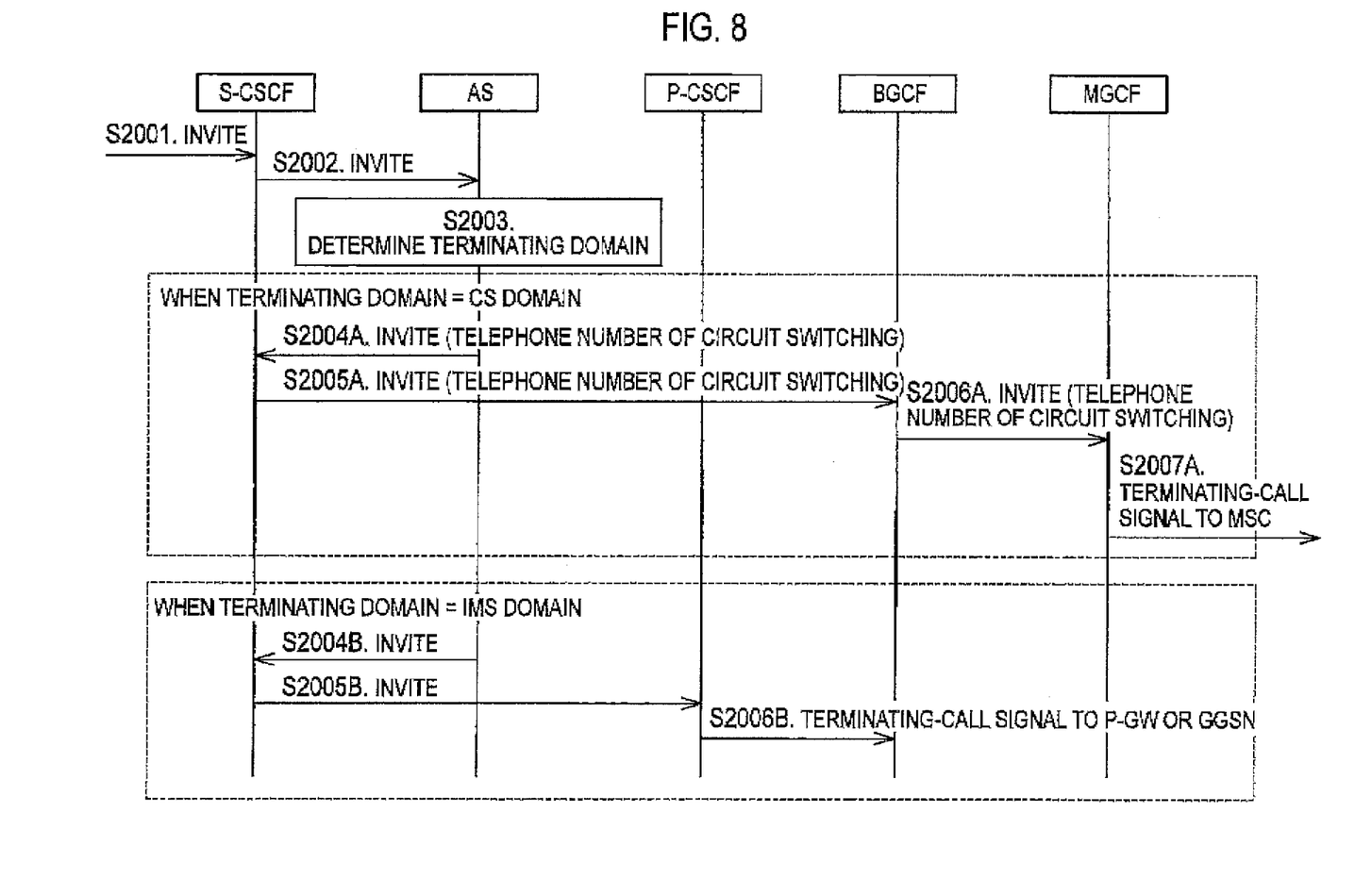
FIG. 8 is a sequence diagram illustrating operations performed by a conventional mobile communication system when it receives a terminating-call signal.
Figure 9:
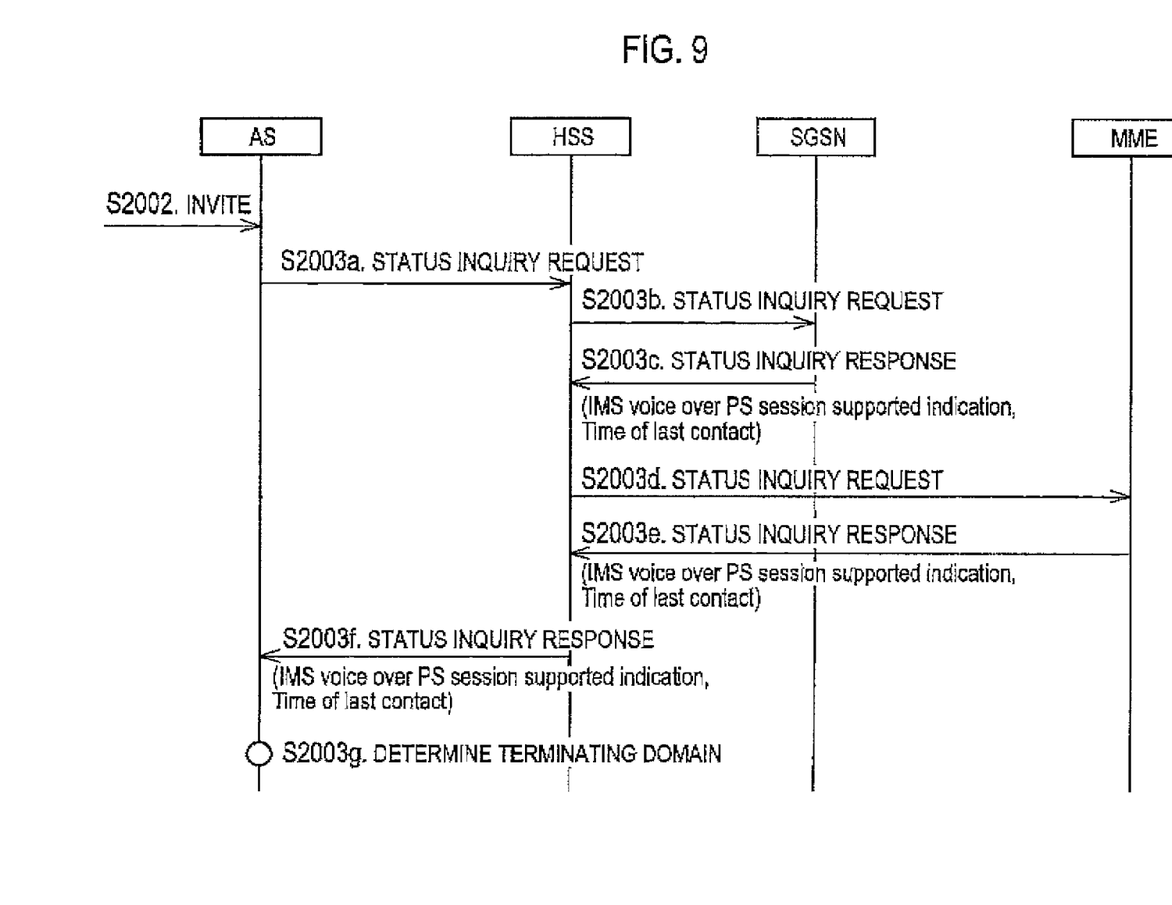
FIG. 9 is a sequence diagram illustrating operations performed by the conventional mobile communication system when it receives a terminating-call signal.

With reference to FIGS. 8 and 9, a description is given of operations performed when a terminating-call signal for telephony service is received in a mobile communication system where a 2G/3G scheme and an LTE (Long Term Evolution) scheme coexist.

As shown in FIG. 8, in Step S2001, a server S-CSCF (Serving Call Session Control Function) receives "INVITE" which is a SIP (Session Initiation Protocol) signal as a terminating-call signal for telephony service. The server S-CSCF then sends an application server AS this "INVITE" in Step S2002.

In Step S2003, the application server AS determines the terminating domain of the "INVITE". Operations of this determination are described below referring to FIG. 9.

Specifically, as shown in FIG. 9, upon receipt of the "INVITE" in Step S2002, the application server AS sends a subscriber information server HSS (Home Subscriber Server) a status inquiry request in Step S2003a.

The subscriber information server HSS sends a switch SGSN (Serving GPRS Support Node) a status inquiry request in Step S2003b, and receives a status inquiry response from the switch SGSN in Step S2003c, the response including "IMS voice over PS session supported indication" and "Time of last contact".

Alternatively, the subscriber information server HSS sends a switch MME (Mobility Management Entity) a status inquiry request in Step S2003d, and receives a status inquiry response from the switch MME in Step S2003e, the response including "IMS voice over PS session supported indication" and "Time of last contact."

Here, "IMS voice over PS session supported indication" is information indicating whether or not a telephony service can be provided via IMS (IP Multimedia Subsystem) in a location registration area (RA: Routing Area or TA: Tracking Area) in which a mobile station UE is currently registered. "IMS voice over PS session supported indication" is information held by the switches SGSN/MME.

In addition, "Time of last contact" is information indicating a time of last communications between the mobile station UE and the switch SGSN/MME.

In Step 2003f, the subscriber information server HSS sends the application server AS a status inquiry response including "IMS voice over PS session supported indication" and "Time of Last Contact"

In Step S2003g, the application server AS determines the terminating domain of the "INVITE" based on "IMS voice over PS session supported indication," "Time of last contact," and the like.

When the determined terminating domain, of the "INVITE" is a CS (Circuit Switch) domain, the application server AS sends the server S-CSCF "INVITE" in Step S200424. Then, in Step S2005A, the server S-CSCF sends a server BGCF (Breakout Gateway Control Function) "INVITE." In Step S2006A, the server BGCF sends a server MGCF (Media Gateway Control Function) "INVITE." In Step S2007A, the server MGCF sends an switch MSC (Mobile-service Switching Center) an ISUP (ISDN User Part) signal as a terminating-call signal for telephony service.

When the determined terminating domain of the "INVITE" is IMS, the application server AS sends the server S-CSCF "INVITE" in Step S2004B. Then, in Step S2005B, the server S-CSCF sends a server P-CSCF (Proxy Call. Session Control Function) "INVITE." In Step 2006B, the server P-CSCF sends the switch P-GW or a switch GGSN (Gateway GPRS Support Node) a packet signal as a terminating-call signal for telephony service.

Figure 10:
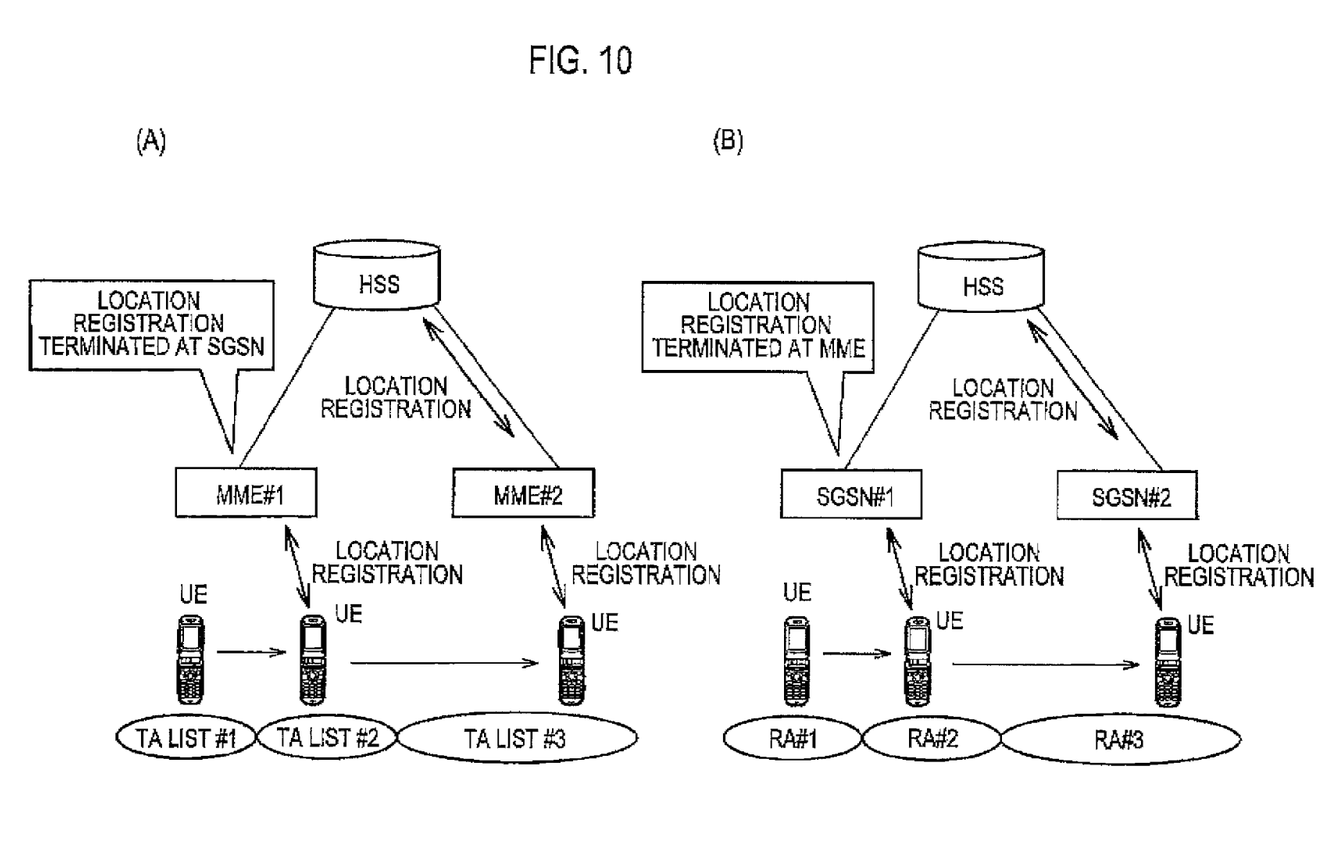
FIG. 10 is a diagram illustrating the operations performed by the conventional mobile communication system in location registration processing of a mobile station.

An existing mobile communication system is configured such that, when a mobile station UE moves across a border between an area covered by an switch MME #1 (i.e., a TA in a TA list #2) and an area covered by an switch MME #2 (i.e., a TA in a TA list #3) as shown in FIG. 10(a), the switch MME #2 performs location registration of the mobile station UE at the subscriber information server HSS.

Similarly, the existing mobile communication system is configured such that, when a mobile station UE moves across a border between an area covered by an switch SGSN #1 (i.e., an RA #2) and an area covered by an switch SGSN #2, an RA #3), the switch SGSN #2 performs location registration of the mobile station UE at the subscriber information server HSS.

In other words, the existing mobile communication system is configured such that the mobile station UE does not perform location registration of the mobile station UE to the same switch SGSN/MME. The switch SGSN/MME is configured to perform location registration of a mobile station at the subscriber information server when the mobile station UE moves across a border between the ME-coverage areas.

Alternatively, the existing mobile communication system is configured such that, when a mobile station UE moves across a border between an area (RA) covered by the switch SGSN and an area (TA) covered by the switch MME, the switch SGSN/MME performs location registration of the mobile station UE at the subscriber information server HSS if ISR (Idle mode Signalling Reduction) is not provided.

Meanwhile, the existing mobile communication system is configured such that, even when a mobile station UE moves across a border between an area (RA) covered by the switch SGSN and an area (TA) covered by the switch MME, the switch SGSN/MME does not perform location registration of the mobile station UE at the subscriber information server HSS if ISR is provided.

Accordingly, as described referring to FIGS. 8 and 9, the subscriber information server HSS is configured to send the switch SGSN/MME a status inquiry request every time "INVITE" is received.

SUMMARY OF THE INVENTION

Problem to be Solved by the Invention

In the mobile communication system described above, the subscriber information server HSS sends and receives signals to and from the switch SGSN/MME every time "INVITE" is received. This leads to problems such as an increased load on a network between the subscriber information server 1155 and the switch SGSN/MME and delay occurrence at a terminating call.

Thus, the present invention has been made in consideration of the problems described above, and aims to provide a mobile communication system, an switch, and a subscriber information server in which a load on a network between the subscriber information server and the switch can be minimized in receiving processing on a terminating-call signal for telephony service in a mobile communication system where multiple communication schemes coexist.

Means for Solving the Problems

The first aspect of the be present invention is summarized as a mobile communication method according to the present invention includes a step A in which, in location registration processing of a mobile station, an switch of a first communication scheme and an switch of a second communication scheme send a subscriber information server first information used to determine whether or not all coverage areas have a same capability of providing a telephony service by packet switching; and a step B in which, when a status inquiry request made upon receipt of a terminating-call signal destined for the mobile station is received from an application server, the subscriber information server determines based on the first information whether or not to make an inquiry at the switch of the first communication scheme or the switch of the second communication scheme about whether or not provision of the telephony service by packet switching is possible in an area where the mobile station is located.

A second aspect of the present invention is summarized as a switch comprising a transmission unit configured to send a subscriber information server first information in location registration processing of a mobile communication, the first information used to determine whether or not all coverage areas have a same capability of providing a telephony service by packet switching.

A third aspect of the present invention is summarized as a subscriber information server comprising: an acquisition unit configured to acquire first information from an switch of a first communication scheme and an switch of a second communication scheme in location registration processing of a mobile station, the first information used to determine whether or not all coverage areas have a same capability of providing a telephony service by packet switching; and a determination unit configured to determine based on the first information whether or not to make an inquiry at the switch of the first communication scheme or the switch of the second communication scheme when a status inquiry request made upon receipt of a terminating-call signal destined for the mobile station is received from an application server, the inquiry being about whether or not provision of a telephony service by packet switching is possible in an area where the mobile station is located.

Effects of the Invention

As described above, the present invention can provide a mobile communication system, a switch, and a subscriber information server in which a load on a network between the subscriber information server and the switch can be minimized in receiving processing of a terminating-call signal for telephony service in a mobile communication system where multiple communication schemes coexist.

MODES FOR CARRYING OUT THE INVENTION (Configuration of Mobile Communication System According to First Embodiment of Present Invention)

Figure 1:
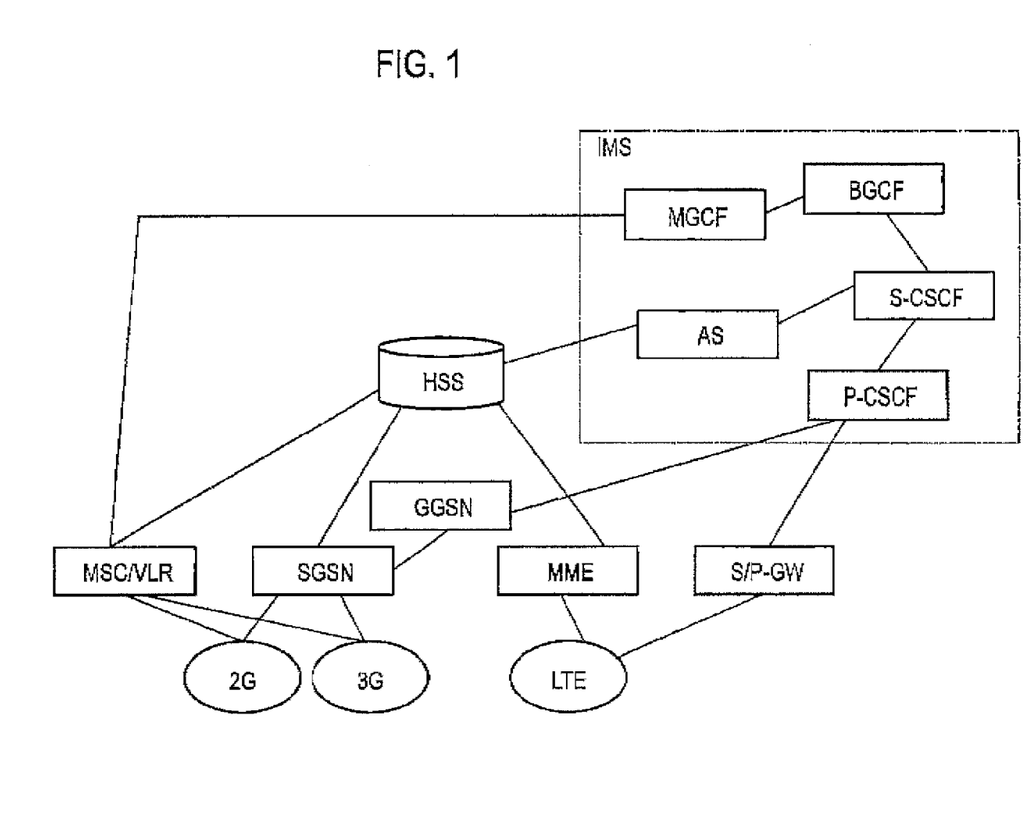
FIG. 1 is a diagram showing the overall configuration of a mobile communication system according to a first embodiment of the present invention.
Figure 2:
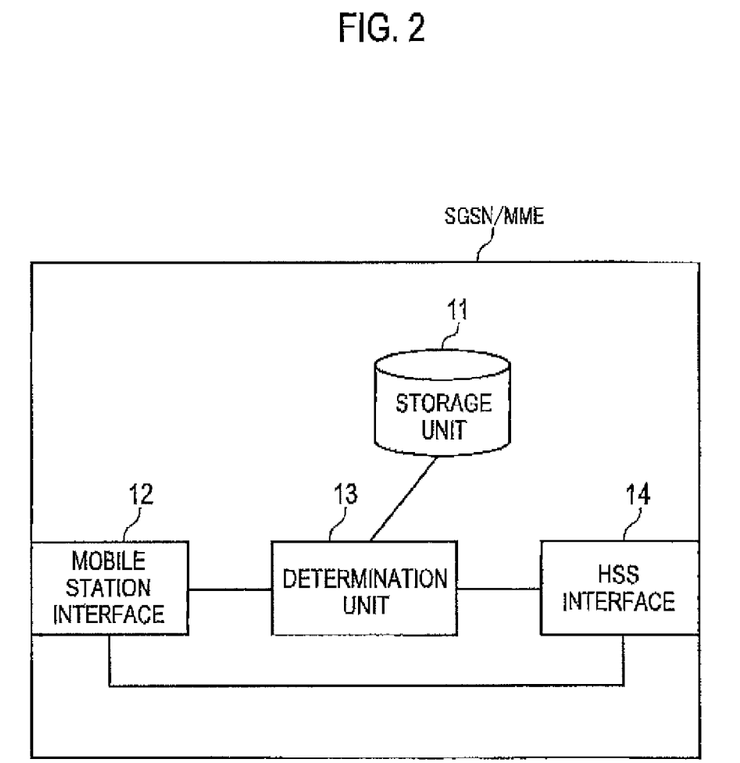
FIG. 2 is a functional block diagram of a switch SGSN/MME according to the first embodiment of the present invention.
Figure 3:
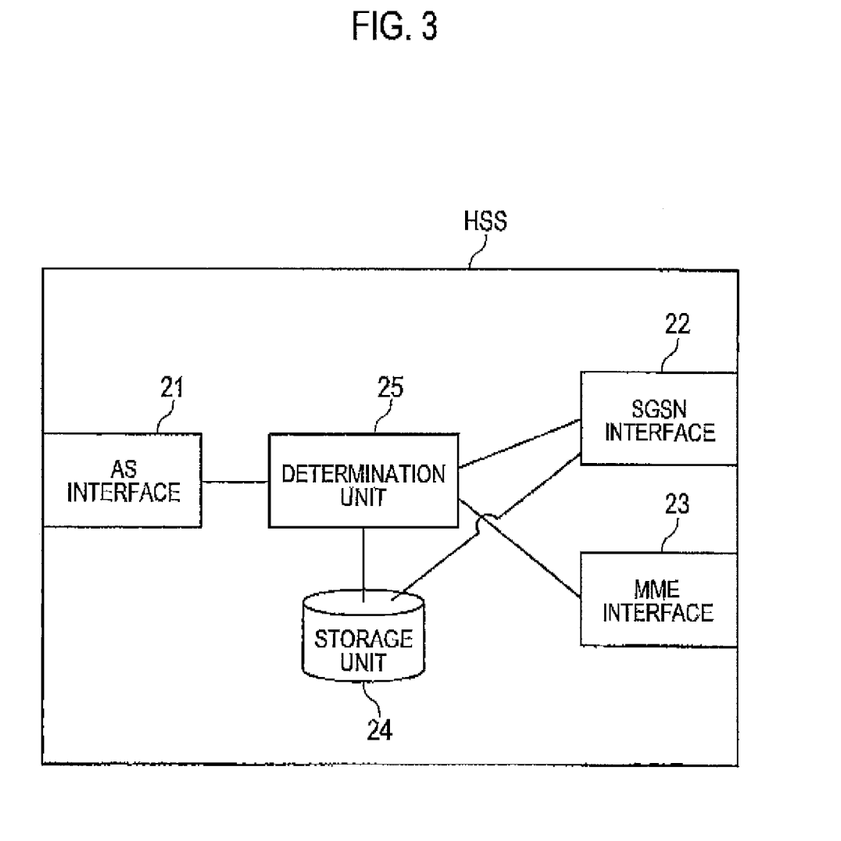
FIG. 3 is a functional block diagram of a subscriber information server HSS according to a first embodiment of the present invention.

With reference to FIGS. 1 to 3, the configuration of a mobile communication system according to a first embodiment of the present invention is described.

As shown in FIG. 1, the mobile communication system according to the present embodiment is a mobile communication system where a 2G/3G scheme and an LTE scheme coexist, and includes a subscriber information server HSS, an switch MSC/VLR (Visitor Location Register), an switch SGSN, an switch GGSN, an switch MME, an switch S-GW/P-GW, a server P-CSCF, a server S-CSCF, a server BGCF, a server and an application server AS.

Here, IMS includes the server P-CSCF, the server S-CSCF, the server BGCF, the server MGCF, and the application server AS.

The subscriber information server HSS is a subscriber information database and is configured to hold information (such as SGSN-ID or MME-ID) on the switch SGSN/MME in which a mobile station UE is currently located.

The switch SGSN is a packet switch of the 2G/3G scheme, the switch MME is a packet switch for control signals employing the LTE scheme, and the switches S-GW/P-GW are packet switches for user data employing the LTE scheme.

The application server AS is a SIP server equipped with a function of determining the terminating domain of a terminating-call signal for telephony service received.

The server S-CSCF is an entry point for a SIP signal as a terminating-call signal for telephony service, and is a SIP server equipped with a function of selecting the application server AS for performing incoming processing.

The server P-CSCF is a SIP server configured to transfer a terminating-call signal for telephony service in IMS to the mobile station UE by using a packet bearer.

The server BGCF is a SIP server having a capability of selecting a destination server MGCF according to the telephone number of a caller.

The server MGCF is a switch device configured, to switch between a SIP signal and an ISUP signal.

As shown in FIG. 2, the switch SGSN/MME includes a storage unit 11, a mobile station interface 12, a determination unit 13, and an HSS interface 14.

The storage unit 11 is configured to store a user profile on the mobile station UE located in an area covered by the switch SGSN/MME.

For example, the storage unit 11 is configured to store "Time of last contact" as the user profile on the mobile station UE located in the area covered by the switch SGSN/MME.

Further, the storage unit 11 is configured to store, as the user profile on the mobile station UE located in the area covered by the switch SGSN/MME, information indicating the area where the mobile station UE is located and whether or not ISR is provided.

Furthermore, the storage unit 11 is configured to store information indicating whether or not a telephony service via IMS can be provided in each of the areas covered by the switch SGSN/MME.

The mobile station interface 12 is an interface between the switch SGSN/MME and the mobile station UE, and is configured to receive a location registration request from the mobile station UE and sends the mobile station UE a location registration response, in each of the areas covered by the switch SGSN/MME. Here, the location registration request includes an Attach request, and the location registration response includes an Attach response.

The determination unit 13 is configured to determine whether or not the user profile on the mobile station UE is stored in the storage unit 11, upon receipt of the location registration request from the mobile station UE through the mobile station interface 12.

Further, the determination unit 13 is configured to determine whether or not ISR is provided to the mobile station UE, when determining that the user profile on the mobile station UE is not stored in the storage unit 11.

The HSS interface 14 is an interface between the switch SGSN/MME and the subscriber information server HSS, and is configured to send the subscriber information server HSS "Location Update" and receive "Location Update Ack" from the subscriber information server HSS.

Specifically, the HSS interface 14 is configured to send the subscriber information server HSS "Location Update" including a new identifier #0, a new identifier #1 (or a new identifier #2), and a new identifier #3.

Here, the new identifier #0 is information for a notification of a value "0" or "1" of above-described "IMS voice over PS session supported indication."

For example, "1" may be set to the new identifier #0 when a telephony service via IMS can be provided in the area where the mobile station UE is currently registered, while may be set to the new identifier #0 when a telephony service via IMS cannot be provided in the area where the mobile station UE is currently registered.

In addition, the new identifier #1 is information indicating whether or not all the TAs covered by the switch MME have the same IMS provision capability.

For example, "0" may be set to the new identifier #1 when all the TAs covered by the switch MM have the same IMS provision capability (i.e., when a telephony service via IMS can be provided in none of the TAs covered by the switch MME or when a telephony service via IMS can be provided in all of the TAs covered by the switch MME), and "1" may be set to the new identifier 41 when not all the TAs covered by the switch MME have the same IMS provision capability.

Similarly, the now identifier #2 is information indicating whether or not all the RAs covered by the switch SGSN have the same IMS provision capability.

For example, "0" may be set to the new identifier #2 when all the RAs covered by the switch SGSN have the same IMS provision capability (i.e., when a telephony service via IMS can be provided in none of the RAs covered by the switch SGSN or when a telephony service via IMS can be provided in all of the RAs covered by the switch SGSN), and "1" may be set to the new identifier #2 when not all the RAs covered by the switch SGSN have the same IMS provision capability.

Further, the new identifier #3 is information indicating whether or not ISR is provided to each mobile station UE.

For example, "1" may be set to the new identifier #3 when ISR is provided to the mobile station UE, and "0" may be set to the new identifier #3 when. ISR is not provided to the mobile station UE.

Note that the new identifiers #0 to #3 may be configured to be included in "Location Update" and sent, only when a predetermined bit (e.g., "1") is set thereto.

As shown in FIG. 3, the subscriber information server HSS includes an AS interface 21, an SGSN interface 22, an MME interface 23, a storage unit 24, and a determination unit 25.

The AS interface 21 is an interface between the subscriber information server HSS and the application server AS, and is configured to receive a status inquiry request from the application server AS and to send the application server AS a status inquiry response including "IMS voice over PS session supported indication," "Time of last contact," and the like.

The SGSN interface 22 is an interface between the subscriber information server HSS and the switch SGSN, and is configured to receive "Location Update" from the switch SGSN and to send the switch SGSN "Location Update Ack."

Further, the SGSN interface 22 is configured to send the switch SGSN a status inquiry request and to receive a status inquiry response from the switch SGSN, the response including "IMS voice over PS session supported indication," "Time of last contact," and the like.

Similarly, the MME interface 23 is an interface between the subscriber information server HSS and the switch MME, and is configured to receive "Location Update" from the switch MME and to send the switch MME "Location Update Ack."

Further, the MME interface 23 is configured to send the switch MME a status inquiry request and to receive a status inquiry response from the switch MME, the response including "IMS voice over PS session supported indication," "Time of last contact," and the like.

The storage 24 is configured to store a first time indicating a time of location registration processing of the mobile station UE via the switch SGSN, as well as a second time indicating a time of location registration processing of the mobile station UE via the switch MME. Here, this location registration processing includes location registration processing in Attach processing.

In addition, the storage unit 24 may be configured to store the values set to the new identifiers #0 to #3 far each mobile station UE which have been received from the switch SGSN/MME.

The determination unit 25 is configured to determine whether or not ISR is provided to the mobile station LTE based on the value set to the new identifier #3 for the mobile station UE, which has been received from the switch SGSN/MME.

Further, the determination unit 25 is configured to determine which of the areas, a 2G/3G scheme area or an LTE scheme area, the mobile station UE is located, by referring to the storage unit 24 and comparing the first time at which the switch SGSN accessed the subscriber information server HSS last (i.e., the first time of the location registration processing of the mobile station UE via the switch SGSN) with the second time at which the switch MME accessed the subscriber information server HSS last (i.e., the second time of the location registration processing of the mobile station UE via the switch MME).

In other words, the determination unit 25 is configured to determine that the mobile station UE is located in the 2G/3G scheme area when determining that the first time is later than the second time, and to determine that the mobile station UE is located in the LTE scheme area when determining that the second time is later than the first time.

Further, the determination unit 25 is configured to determine whether or not all the RAs covered by the switch SGSN have the same IMS provision capability (which is a capability of providing a telephony service via IMS) based on the value set to the new identifier 41 for the mobile station UE, which, is received from the switch SGSN.

The determination unit 25 is also configured to determine whether or not all the TAs covered by the switch MME have the same IMS provision capability (which is a capability of providing a telephony service via IMS) based on the value set to the new identifier #1 for the mobile station UE, which is received from the switch MME.

(Operations of Mobile Communication System According to First Embodiment of Present Invention)

With reference to FIGS. 4 to 7, a description is given of the operations of the mobile communication system according to the first embodiment of the present invention.

Figure 4:
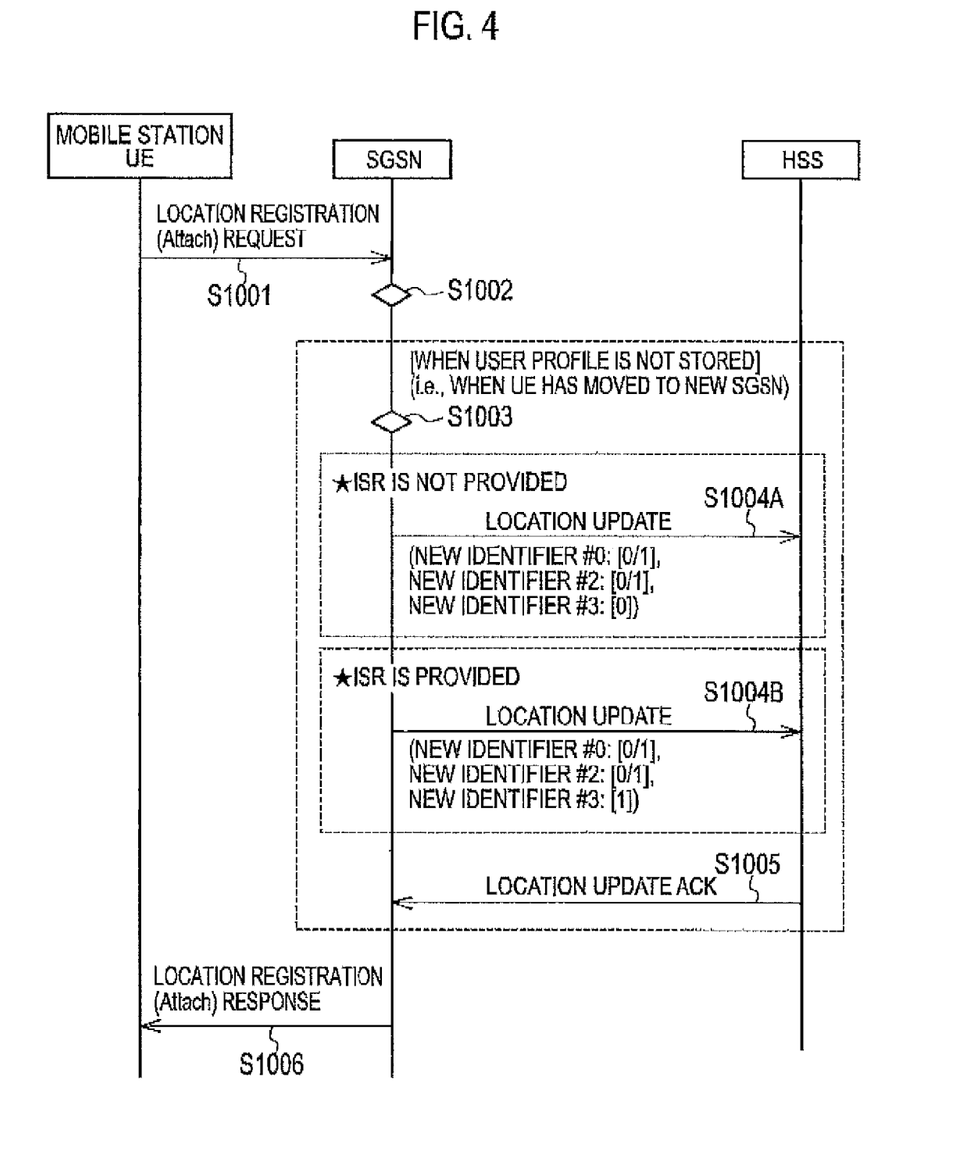
FIG. 4 is a sequence diagram illustrating the operations of the mobile communication system according to the first embodiment of the present invention.

First, a description is given, referring to FIG. 4, of the operations performed when the mobile station UE performs the location registration processing via the switch SGSN in the mobile communication system according to the present invention.

As shown in FIG. 4, the mobile station UE sends the switch SGSN a location registration request in Step S1001. Here, the location registration request may be a location registration request (Attach request) for only the PS domain or may be a location registration request (Attach request) made simultaneously for both of an LA (Local Area) and an RA.

In Step S1002, the switch SGSN determines whether or not the user profile on the mobile storage UE is stored whether or not the request is a new location registration request to the switch SGSN).

When determining that the user profile on the mobile station is not stored, the switch SGSN determines whether or not ISR is provided to the mobile station UE in Stepp S1003.

When determining that ISR is not provided to the mobile station UE, in Step S1004A the switch SGSN sends the subscriber information server HSS "Location Update" including: the new identifier #0 to which a value "0/1" of "IMS voice over PS session supported indication" is set; the new identifier #1 to which a value "0/1" indicating whether or not all the RAs covered by the switch SGSN have the same IMS provision capability; and the new identifier #3 to which a value "0" indicating that ISR is not provided to the mobile station UE is set.

On the other hand, when determining that ISR is provided to the mobile station UE, in Step S1004B the switch SGSN sends the subscriber information server HSS "Location update" including: the new identifier #0 to which a value "0/1" of "IMS voice over PS session supported indication" is set; the new identifier #1 to which a value "0/1" indicating whether or not all the RAs covered by the switch SGSN have the same IMS provision capability; and the new identifier #3 to which a value "1" indicating that ISR is provided to the mobile station UE is set.

The subscriber information server HSS sends the switch SGSN "Location Update Ack" in Step S1005, and the switch SGSN sends the mobile station UE a location registration response in Step S1006.

Figure 5:
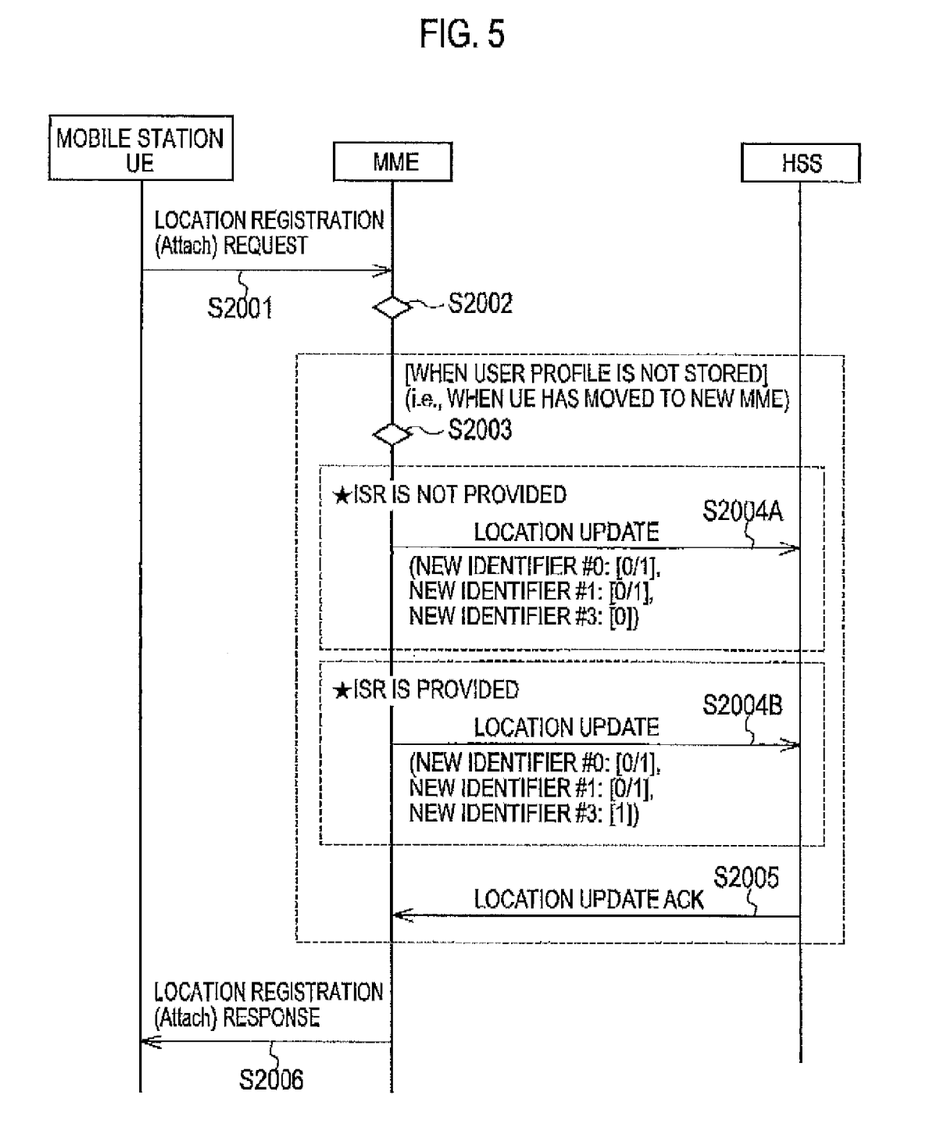
FIG. 5 is a sequence diagram illustrating the operations of the mobile communication system according to the first embodiment of the present invention.

Secondly, a description is given, referring to FIG. 5, of the operations performed when the mobile station UE performs the location registration processing via the switch MME in the mobile communication system according to the present invention.

As shown in FIG. 5, the mobile station UE sends the switch MME a location registration request in Step S2001. Here, the location registration request may be a location registration request (Attach request) for only the LTE scheme or may be a location registration request (Attach request) made simultaneously for both of an LA (Local Area) and an RA used in CS Fallback and the like.

In Step S2002, the switch MME determines whether or not the user profile on the mobile storage UE is stored (i.e., whether or not the request is a new location registration request to the switch MME).

When determining that the user profile on the mobile station is not stored, the switch MME determines whether or not ISR is provided to the mobile station UE in Step S2003.

When determining that ISR is not provided to the mobile station UE, in Step S2004A the switch MME sends the subscriber information server HSS "Location Update" including: the new identifier #0 to which a value "0/1" of "IMS voice over PS session supported indication" is set; the new identifier #2 to which a value "0/1" indicating whether or not all the TAs covered by the switch MME have the same IMS provision capability; and the new identifier #3 to which a value "0" indicating that ISR is not provided to the mobile station UE is set.

On the other hand, when determining that ISR is provided to the mobile station UE, in Step S2004E the switch MME sends the subscriber information server HSS "Location Update" including: the new identifier #0 to which a value "0/1" of "IMS voice over PS session supported indication" is set; the new identifier #2 to which a value "0/1" indicating whether or not all the TAs covered by the switch MME have the same IMS provision capability; and the new identifier #3 to which a value "1" indicating that ISR is provided to the mobile station UE is set.

The subscriber information server HSS sends the switch MME "Location Update Ack" in Step S2005, and the switch MME sends the mobile station UE a location registration response in Step S2006.

Figure 6:
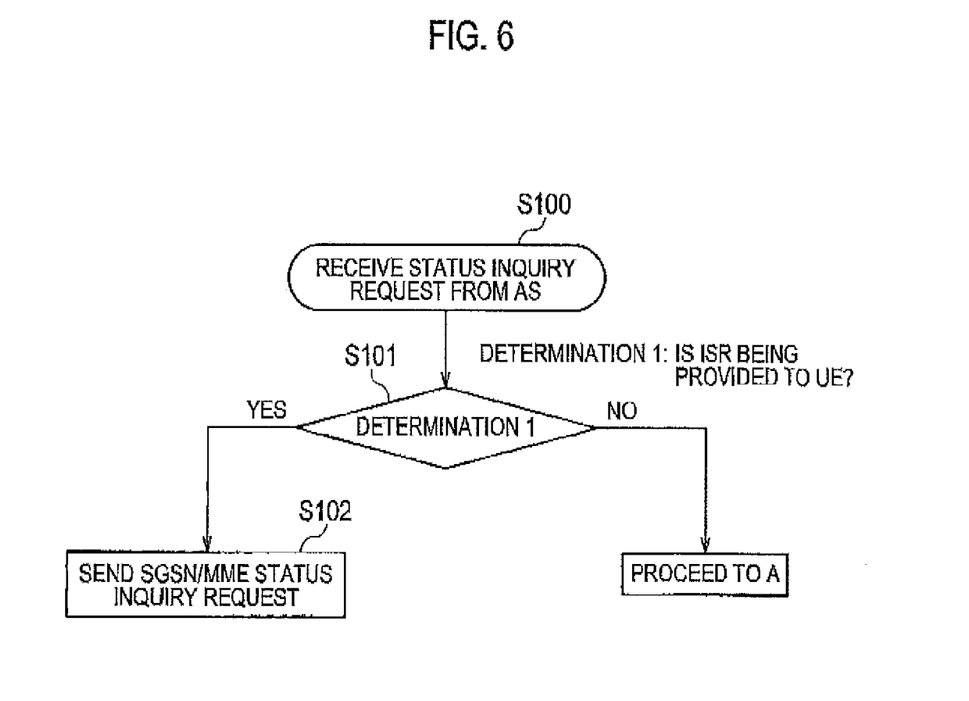
FIG. 6 is a flowchart illustrating the operations of the subscriber information server HSS according to the first embodiment of the present invention.
Figure 7:
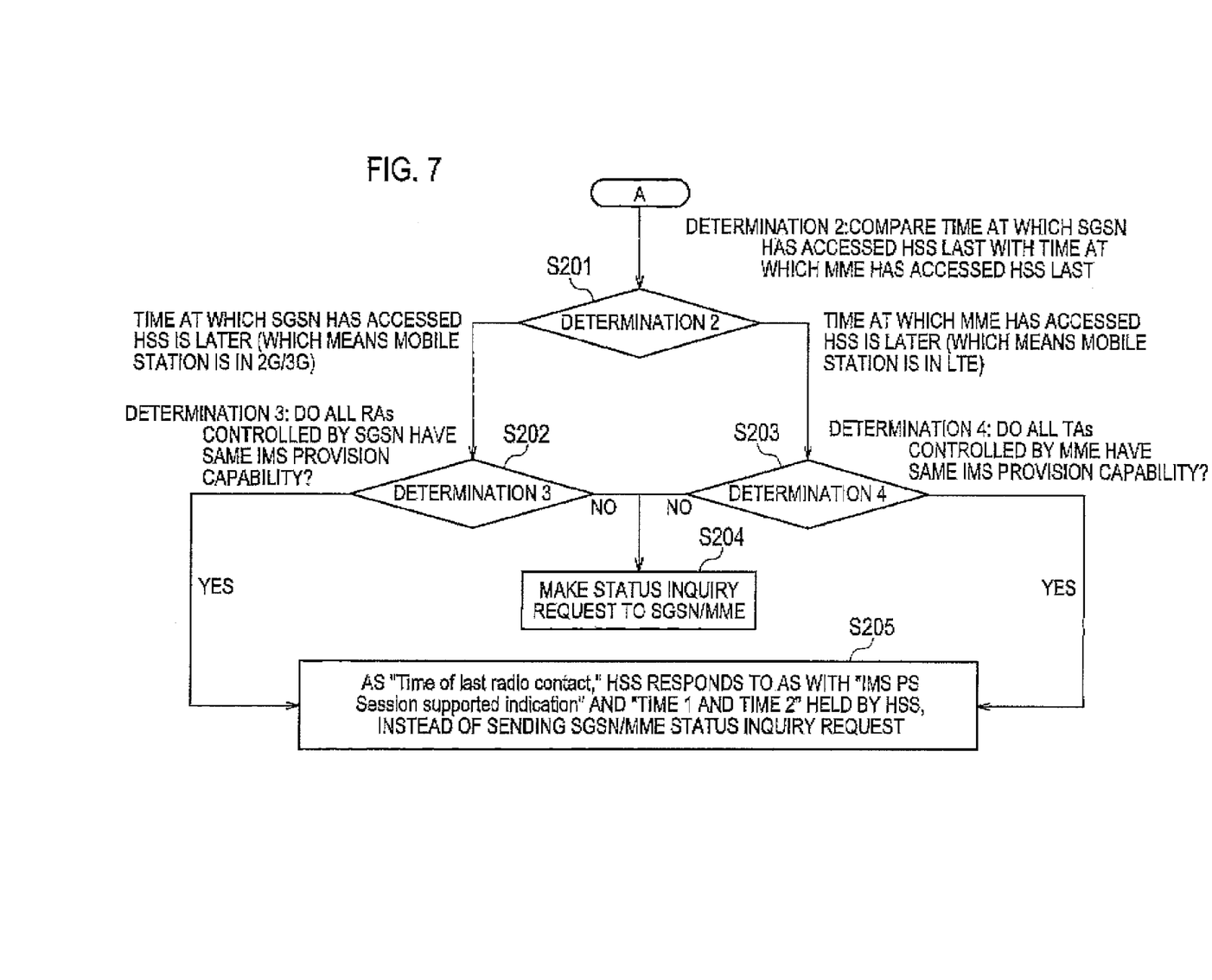
FIG. 7 is a flowchart illustrating the operations of the subscriber infatuation server HSS according to the first embodiment of the present invention.

Thirdly, with reference to FIGS. 6 and 7, a description is given of operations of the subscriber info illation server HSS according to the present embodiment.

As shown in FIG. 5, the subscriber information server HSS receives a status inquiry request from the application server AS in Step S100, and then determines whether or not ISR is provided to the mobile station UE in Step S101 (Determination 1).

When determining that ISR is provided to the mobile station LTE, in Step S102 the subscriber information server HSS sends the switch SGSN and the switch MME a status inquiry request for "IMS voice over PS session supported indication," "Time of last contact," and the like.

Here, the subscriber information server HSS may be configured such that, when it determines that ISR is provided to the mobile station UE, processing proceeds not to Step S102 but to Step S205 shown in FIG. 7, where the subscriber information server HSS sends the application server AS a status inquiry response including "IMS voice over PS session supported indication," "Time of last contact," and the like, instead of sending the switch SGSN and the switch MME the status inquiry request described above.

When the subscriber information server HSS determines that ISR is not provided to the mobile station UE, the operations proceed to A shown in FIG. 7.

As shown in FIG. 7, in Step S201, the subscriber information server HSS determines which of the areas, a 2G/3G scheme area or an LTE scheme area, the mobile station UE is located, by comparing the first time at which the switch SGSN accessed the subscriber information server HSS last (i.e., the first time of the location registration processing of the mobile station UE via the switch SGSN) with the second time at which the switch MME accessed the subscriber information server HSS last the second time of the location registration processing of the mobile station UE via the switch MME) (Determination 2).

When determining that the mobile station is located in a 2G/3G area, in Step S202 the subscriber information server HSS determines whether or not all the RAs covered by the switch SGSN have the same TMS provision capability (which is a capability of providing a telephony service via IMS) (Determination 3).

When the subscriber information server HSS determines that all the RAs covered by the switch SGSN have the same TMS provision capability, the operations proceed to Step S205, and in other cases, the operations proceed to Step S204.

Similarly, when determining that the mobile station is located in an LTE area, in Step S203 the subscriber information server HSS determines whether or not all the TAs covered by the switch MME have the same IMS provision capability (which is a capability of providing a telephony service via IMS) (Determination 4).

When the subscriber information server HSS determines that all the TAs covered by the switch MME have the same IMS provision capability, the operations proceed to Step S205, and in other cases, the present operations proceed to Step S204.

In Step S204, the subscriber information server HSS sends the switch SGSN and the switch MME a status inquiry request for "IMS voice over PS session supported indication," "Time of last contact," and the like.

In Step S205, instead of sending the switch SGSN and the switch MME the above-described status inquiry request, the subscriber information server HSS sends the application server AS a status inquiry response including "IMS voice over PS session supported indication," "Time of last contact," and the like.

Here, "Time of last contact" includes the first time and the second time described above stored by the subscriber information server HSS.

(Advantageous Effects of Mobile Communication System According to First Embodiment of Present Invention)

In the mobile communication system according to the present embodiment, when determining that all the RAs/TAs covered by the switch SGSN/MME have the same IMS provision capability (which is a capability of providing a telephony service via IMS), the subscriber information server HSS can send the application server AS a status inquiry response, without inquiring of the switches SGSN/MME. Accordingly, a load on a network between the subscriber information server HSS and the switches SGSN/MME can be minimized in receiving processing on a telephony service terminating-call signal in a mobile communication system where the 2G/3G scheme and the LTE scheme coexist.

The characteristic of the present embodiment described above can be expressed as follows.

A first aspect of the present embodiment is a mobile communication method which is summarized as comprising: a step A in which, in location registration processing of a mobile station UE, an switch SGSN employing a 2G/3G scheme (a first communication scheme) and an switch MME employing an LTA scheme (a second communication scheme) send a subscriber information server HSS first information (e.g., the new identifier #1 or 2) used to determine whether or not all coverage areas (RAs or TAs) have a same capability of providing a telephony service via IMS (a telephony service by packet switching); and a step B in which, when a status inquiry request made upon receipt of a terminating-call signal (INVITE) destined for the mobile station UE is received from an application server AS, the subscriber information server HSS determines based on the first information whether or not to make an inquiry at the switch SGSN or the switch MME about whether or not provision of the telephony service via IMS is possible in an area (RA or TA) where the mobile station UE is located.

In the first aspect of the present embodiment, the mobile communication method may further comprise a step in which the subscriber server HSS stores a first time and a second time, the first time indicating a time of location registration processing of the mobile station UE via the switch SGSN, the second time indicating a time of location registration processing of the mobile station UE via the switch MME. In the step B, based on the first time and the second time, the subscriber information server HSS may determine at which one of the switch SGSN or the switch MME the inquiry is to be made.

In the first aspect of the present embodiment, in the step A, the switch SGSN and the switch MME may send the subscriber information server HSS second information indicating whether or not a setting is made such that location registration processing of the mobile station UE does not have to be performed when the mobile station moves across a border between a 2G/3G scheme area (RA) and an LTE scheme area (TA) (i.e., a setting such that ISR is provided). In the step B, when determining based on the second information that the setting is made such that ISR is provided, the subscriber server device HSS may make the inquiry at the switch SGSN or the switch MME, regardless of what the first information indicates.

A second aspect of the present embodiment is an switch SGSN/MME which is summarized as comprising an HSS interface 14 configured to send a subscriber inforamation server HSS first information in location registration processing of a mobile station UE, the first information used to determine whether or not all coverage areas (RAs or TAs) have a same capability of providing a telephony service via IMS.

In the second aspect of the present embodiment, the HSS interface 14 may be configured to send the subscriber information server HSS second information indicating whether or not a setting is made such that ISR is provided.

A third aspect of the present embodiment is a subscriber information server which is summarized as comprising: an SGSN interface 22/MME interface 23 configured to acquire first information from an switch SGSN and an switch WE in location registration processing of a mobile station UE, the first information used to determine whether or not all coverage areas (RAs or TAs) have a same capability of providing a telephony service via IMS; and a determination unit 25 configured to determine based on the first information whether or not to make an inquiry at the switch SGSN or the switch TIME when a status inquiry request made upon receipt of a terminating-call signal (INVITE) destined for the mobile station. DE is received from an application server AS, the inquiry being about whether or not provision of a telephony service via IMS is possible in an area (RA or TA) where the mobile station UE is located.

In the third aspect of the present embodiment, the subscriber information server may further comprise a storage unit 24 configured to store a first time and a second time, the first time indicating a time of location registration processing of the mobile station UE via the switch SGSN, the second time indicating a time of location registration processing of the mobile station UE via the switch MME. The determination unit 25 may be configured to make determination based on the first time and the second time in response to the status inquiry request, regarding at which one of the switch SGSN or the switch MME the inquiry is to be made.

In the third aspect of the present embodiment, the SGSN interface 22/MME interface 23 is configured to acquire second information from the switch SGSN and the switch MME in location registration processing of the mobile station UE, the second information indicating whether or not a setting is made such that ISR is provided. The determination unit 25 may be configured to, when determining that the setting is made such that ISR is provided, determine that the inquiry is to be or not to be made at the switch SGSN or the switch MME, based on the second information, regardless of what the first information indicates.

Note that the above-described operations of the mobile station UE, the switches SGSN/MME, the subscriber information server HSS, and the application server may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UT, the switches SGSN/MME, the subscriber information server HSS, and the application server. Also, the storage medium and the processor may be provided in the mobile station UE, the switches SGSN/MME, the subscriber information server HSS, and the application server as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, the present invention can provide a mobile communication method, a switch, and a subscriber information server in which a load on a network between a subscriber information server and a switch can be minimized load receiving processing on a telephony service terminating-call signal in a mobile communication system where multiple communication schemes coexist.

EXPLANATION OF REFERENCE NUMERALS

SGSN, MME . . . switch
HSS . . . subscriber information server
11, 24 . . . storage unit
12 . . . mobile station interface
13, 25 . . . determination unit
14 . . . HSS interface
21 . . . AE interface
22 . . . SGSN interface
23 . . . MME interface

The invention claimed is:

1. A mobile communication method comprising:
   a step A in which, in location registration processing of a mobile station, a switch of a first communication scheme and a switch of a second communication scheme send location update information to a subscriber information server, wherein the location update information includes an information element the information element being used to determine whether or not all coverage areas covered by the switches have a same capability of providing a telephony service by packet switching; and
   a step B in which, when a status inquiry request made upon receipt of a terminating-call signal destined for the mobile station is received from an application server, the subscriber information server determines based on the location update information whether or not to make an inquiry at the switch of the first communication scheme or the switch of the second communication scheme about whether or not providing the telephony service by packet switching is possible in an area where the mobile station is located.

2. A switch of a first communication scheme comprising a transmission unit configured to send location update information to a subscriber information server, wherein the location update information includes an information element, the information element being used to determine whether or not all coverage areas covered by the switches have a same capability of providing a telephony service by packet switching,
   wherein the location update information is used to determine by the subscriber information server whether or not to make an inquiry at the switch of the first communication scheme or the switch of the second communication scheme about whether or not providing the telephony service by packet switching is possible in an area where the mobile station is located when the subscriber information server received a status inquiry request made upon receipt of a terminating-call signal destined for the mobile station is received from an application server.

3. A subscriber information server comprising:
   an acquisition unit configured to acquire location update information from a switch of a first communication scheme and a switch of a second communication scheme in location registration processing of a mobile station, wherein the location update information includes an information element, the information element being used to determine whether or not all coverage areas covered by the switches have a same capability of providing a telephony service by packet switching; and
   a determination unit configured to determine based on the location update information whether or not to make an inquiry at the switch of the first communication scheme or the switch of the second communication scheme when a status inquiry request made upon receipt of a terminating-call signal destined for the mobile station is received from an application server, the inquiry being about whether or not provision of a telephony service by packet switching is possible in an area where the mobile station is located.

4. A mobile communication system comprising a switch of a first communication scheme, a switch of a second communication scheme and a subscriber information server, wherein the switch of a first communication scheme and the switch of a second communication scheme are configured to transmit location update information in location registration processing of a mobile station to the subscriber information server, wherein the location update information includes an information element, the information element being used to determine whether or not all coverage areas covered by the switches have a same capability of providing a telephony service by packet switching; and the subscriber information server is configured to determine based on the location update information whether or not to make an inquiry at the switch of the first communication scheme or the switch of the second communication scheme when a status inquiry request made upon receipt of a terminating-call signal destined for the mobile station is received from an application server, the inquiry being about whether or not providing of a telephony service by packet switching is possible in an area where the mobile station is located.

* * * * *